United States Patent Office 3,259,518
Patented July 5, 1966

3,259,518
INORGANIC OXIDE MATERIALS COATED WITH MONOEPOXIDE - AMINOALKYLSILICON COMPOUND ADDUCTS
Samuel Sterman and James G. Marsden, Tonawanda, N.Y., assignors to Union Carbide Corporation, a corporation of New York
No Drawing. Filed Mar. 15, 1962, Ser. No. 180,009
8 Claims. (Cl. 117—76)

This invention relates to compositions useful for treating inorganic oxide materials prior to preparation of composite articles therefrom. More particularly, the invention relates to a composition and process for sizing or finishing inorganic oxide materials suitable for use as fillers prior to the preparation of reinforced plastic articles therefrom.

Inorganic oxide materials in various forms such as for example, fibers, rovings, powders, mats and cloth, have been widely employed as fillers or reinforcing means for numerous plastics. Of considerable interest are the glass cloth-reinforced or glass fiber-filled plastic sheets, commonly referred to as "laminates," especially those laminates prepared from fibrous glass materials and thermosetting plastics. Also of interest are similar composite articles, as for example, the asbestos sheet-reinforced or asbestos fiber-filled thermosetting materials as well as the mica-, quartz- and other inorganic oxide-reinforced thermosetting materials wherein the inorganic oxides are in a particulate or pulverulent form. Such reinforced plastics because of their generally high strength to weight ratio, have been found particularly desirable for use in the aircraft and related industries. Other uses are found in the fields of building construction, home furnishings and sporting equipment.

The thermosetting plastics which are most often employed as binders in the preparation of fibrous glass or asbestos and other inorganic oxide composite articles include the aldehyde condensation resins and the epoxy resins. Illustrative of the better known aldehyde condensation resins include the phenol-formaldehyde resins, (phenolic resins), the melamine-formaldehyde resins, (melamine resins) and the urea-formaldehyde resins. The widely used epoxy-type resins are those which comprise glycidyl ethers of polyhydric phenols, such as the diglycidyl ethers of diphenylolmethanes.

Considerable effort has been devoted toward providing fibrous glass or asbestos laminates having a high degree of lasting adhesion between the fiber surfaces and the resin binder, especially under conditions of high humidity or of water contact. Accordingly, it is an object of this invention to provide compositions effective in improving the adherence of inorganic oxides, as for example, fibrous glass, asbestos, mica, quartz, diatomaceous earth and other inorganic oxide materials, including those materials in particulate or pulverulent form to thermosetting resins, particularly such thermosetting resins as the aldehyde condensation resins, and the epoxy resins by modifying the surface characteristics of such oxide materials.

We have found that plastic articles, such as laminates, prepared from inorganic oxide materials, as for example, glass and asbestos, and thermosetting resins, as for example, the aldehyde condensation resins and the epoxy resins having a superior filler to resin bond are produced by treating the inorganic oxide materials with compositions containing N-substituted aminoalkyl silicon compounds. The inorganic oxide materials can be treated with the N-substituted aminoalkyl silicon compound composition prior to combination with the thermosetting resin, or the inorganic oxide material can be treated with a blended mixture of thermosetting resins and N-substituted aminoalkyl silicon compound composition.

The N-substituted aminoalkyl silicon compound compositions useful in this invention are organic solvent solutions of the adducts resulting from the reaction of monoepoxides with organosilicon compounds containing silicon-bonded aminoalkyl groups. The compositions useful in this invention can be produced by a process that includes forming a reactive mixture of an aminoalkylsilicon compound having from one to three hydrogen atoms attached to nitrogen atoms of the aminoalkyl silicon compound with a monoepoxide in an organic solvent and maintaining the mixture at a temperature at which at least one of the hydrogen-nitrogen bonds in the aminoalkyl-silicon compound and the monoepoxide react to produce the N-substituted aminoalkylsilicon compounds useful in this invention.

The fundamental reaction occurring between the aminoorganosilicon compound and the monoepoxide involves the addition of the amino group to the epoxy group to form a nitrogen to carbon bond linking the amino organosilicon compound molecule to the epoxy compound molecule and also a hydroxyl group attached to the epoxy compound molecule. Using the reaction between a gamma-aminopropylsilicon compound and butylene oxide as exemplary, the fundamental reaction is illustrated by the equation:

(a)
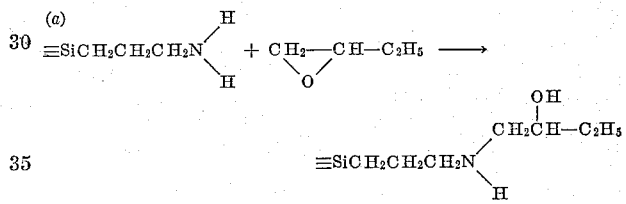

When amounts of reactants containing one epoxy equivalent for each amino hydrogen equivalent are used the reaction proceeds further, as follows:

(b)
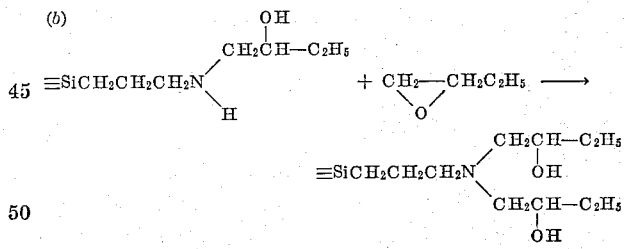

Although the foregoing equations show reactions employing stoichiometric amounts of the reactants, other than stoichiometric amounts of reactants can be used.

In addition to the fundamental reaction described above, additional side reactions can take place. For example, an ester interchange reaction between hydroxyl groups on the initial adduct and alkoxy groups of an aminoalkyl-alkoxysilane can take place as follows:

(c)
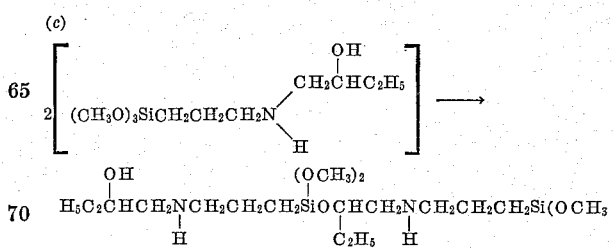

or:

(d) 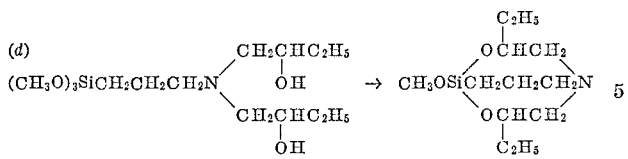

Also, the free N-H groups in product of Equation c can react with additional monoepoxide molecules.

The final reaction product can thus comprise a complex mixture of many different varieties of N-substituted aminoalkylsilicon compounds.

The aminoalkyl silicon compounds which can be used in the process for preparing the sizing or finishing compositions of this invention include silanes represented by the formula:

(A) 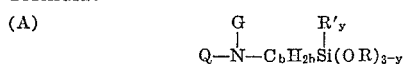

wherein $b$ is an integer having a value from three to about ten, R is an alkyl group, R' is a monovalent hydrocarbon group, $y$ is an integer having a value of zero to one, G is a hydrogen atom or an R' group, and Q is a hydrogen atom or a monovalent group represented by one of the formulas:

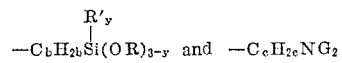

wherein $b$, R, R', $y$ and G have the meanings defined above and $c$ is an integer having a value from two to about 10, provided that each silicon atom is separated from nitrogen by at least three carbon atoms of a $C_bH_{2b}$ group, nitrogen atoms (when two nitrogens are present in the molecule) are separated from each other by at least two carbon atoms of the $C_cH_{2c}$ group and at least one G group is a hydrogen atom.

Preferably the R and R' groups each contain from one to above twelve carbon atoms and $b$ and $c$ each have a value of 3 or 4. Illustrative of the alkyl groups which R and R' can represent include methyl, ethyl, isooctyl, propyl, dodecyl, and the like, while examples of the monovalent hydrocarbon groups in addition to alkyl which R' can represent include phenyl, tolyl, cumyl, betaphenylthyl, mesityl, cyclopentyl, cyclohexyl, allyl, diphenyl, naphthyl, and the like. Illustrative of the silanes of Formula A are Trimethoxysiliylpropylamine,
Diethoxycyclopentylsilylpropylamine,
Triethoxysilylpropylamine,
Triethoxysilyl-n-butylamine,
Triethoxysilylisobutylamine,
Triethoxysilyl-n-pentylamine,
Diethoxymethylsilylpropylamine,
Diethoxyethylsilylpropylamine,
Diethoxyphenylsilylpropylamine,
Tributoxysilylpropylamine,
Diethoxymethylsilyl-n-butylamine,
Triethoxysilyl-n-decylamine,
Diethoxyethylsilyl-n-butylamine,
Diethoxyphenylsilyl-n-butylamine,
Bis(triethoxysilylpropyl)amine,
Bis(diethoxymethylsilylpropyl)amine,
Bi(triethoxysilyl-n-butyl)amine,
Dimethoxy-beta-phenylethylsilylpropylamine,
N-ethyl-gamma-aminopropyltriethoxysilane,
N-phenyl-delta-aminobutylallyldimethoxysilane,
N(beta-aminoethyl)-gamma-aminopropyltrimethoxysilane,
N(N-phenyl-gamma-aminopropyl)-delta-aminobutylmethyldiethoxysilane,
N(N,N-dimethyl-beta-aminoisopropyl)-gamma-aminoisobutyltributoxysilane,
N(beta-aminoethyl)-N-ethyl-gamma-aminopropyltriethoxysilane,
and the like.

A preferred class of aminoalkyl silanes included within the scope of Formula A are the silanes represented by the formula:

(A') 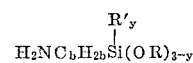

wherein $b$, R, R' and $y$ have the meanings defined hereinabove with reference to Formula A and the nitrogen atom is separated from silicon by at least three carbon atoms of the $C_bH_{2b}$ group.

The aminoalkyl silicon compounds which can be used in the process for preparing the sizing or finishing compositions of this invention include cyclic and non-cyclic siloxane homopolymers which contain units represented by the formula:

(B) 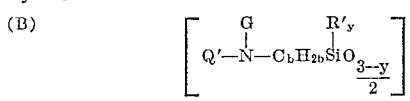

and cyclic and non-cyclic siloxane compolymers which contain from 1 to 99 mole percent of units represented by Formula B and from 99 to 1 mole percent of units represented by the formula:

(C) 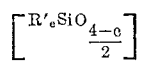

In Formulas B and C, the symbols $b$, R, R', $y$, and G have the meanings defined hereinabove with reference to Formula A, $e$ is an integer having a value from 1 to 3, inclusive, Q' is a hydrogen atom or a group represented by one of the formulas

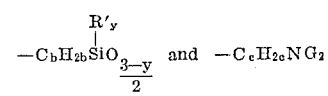

wherein $b$, R, R', $y$ and G have the meanings defined above, $c$ is an integer having a value from three to about ten, and in Formula B each silicon atom is separated from nitrogen by at least three carbon atoms of a $C_bH_{2b}$ group, nitrogen atoms are separated from each other by at least two carbon atoms of a $C_cH_{2c}$ group and at least one G group is a hydrogen atom.

Such polysiloxanes can be prepared by the hydrolysis and condensation of the silanes of Formula A previously described or by the cohydrolysis and cocondensation of the silanes of Formula A with other hydrolyzable silanes.

The operable aminoalkylpolysiloxanes include polysiloxanes of the cross-linked variety and polysiloxanes of the linear and cyclic variety. Aminoalkylpolysiloxanes of the cross-linked variety are produced by the hydrolysis and condensation of silanes of Formula A which contain three alkoxy groups attached to each silicon atom and the polymers can contain small amounts of silicon-bonded hydroxyl or silicon-bonded alkoxy groups depending upon the conditions under which the polymerization is conducted.

A preferred class of operable polysiloxanes can be depicted as containing the structural unit:

(D) 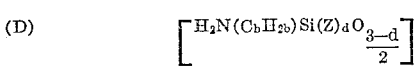

wherein $b$ has the value previously described, Z represents a hydroxyl or alkoxy group and $d$ has an average value of from 0 to 2 and preferably from 0.1 to 1. Typical of such polysiloxanes are gamma-aminopropylpolysiloxane, delta-aminobutylpolysiloxane as well as their corresponding hydroxyl and alkoxy containing polymers.

Aminoalkylpolysiloxanes of the cyclic and linear variety are prepared by the hydrolysis and condensation of silanes of Formula A which contain two alkoxy groups bonded to a single silicon atom. Such processes result in products which contain both cyclic and linear aminolkylsiloxanes. A preferred class of polysiloxanes of this variety can be graphically represented by the structural formula:

(E) 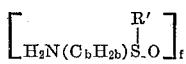

wherein R' and b have the values previously described and f is an integer having a value of at least three and can be as high as seven for the cyclic polysiloxanes and higher for the linear polysiloxanes. Typical of the cyclic siloxanes of Formula E are the cyclic tetramer of gamma-aminopropylmethylsiloxane and the cyclic tetramer of delta - aminobutylmethylpolysiloxane. Included among the useful linear aminoalkylpolysiloxanes of Formula E are the hydroxyl, alkoxy and alkyl end-blocked polysiloxanes such as the triethoxysilyl end-blocked linear gamma-aminopropylmethylpolysiloxane.

In general, any monoepoxide

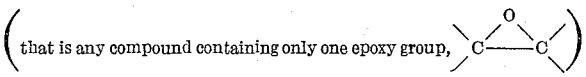

can be used as a starting material in preparing the compositions useful in this invention. By the term "monoepoxide," as used herein, is meant a compound containing oxirane oxygen attached to two vicinal carbon atoms. Suitable monoepoxides include: the linear aliphatic monoepoxides such as ethylene oxide, propylene oxide, butadiene monoxide and diisobutylene monoxide; the cycloaliphatic monoepoxides such as cyclopentene monoxide and cyclohexene monoxide; the aromatic and cycloaliphatic substituted olefin oxides such as styrene oxide, 2,3-epoxypropyl benzene, and 1-cyclohexyl-2-3-epoxypropane; hydroxy-containing cycloaliphatic monoepoxides such as 2,3-epoxy-cyclopentanol and 3,4-epoxy-6-methylcyclohexylmethanol; the glycidyl ethers such as phenyl glycidyl ether, benzyl glycidyl ether and butyl glycidyl ether; the glycidyl esters such as glycidyl acetate; and the like.

The relative amounts of the aminoalkylsilicon compound and the monoepoxide used as starting materials are not narrowly critical. The reaction theoretically requires one epoxy equivalent for each equivalent of amino hydrogen to be replaced in the amino alkylsilicon compound. However, less or greater amounts can be used.

The temperature used in producing the compositions useful in this invention is not narrowly critical, and will vary depending on the particular reaction mixture that is being employed. Temperatures below about 0° C. are not preferred because the reaction may be too sluggish. Temperatures much above about 200° C. are not generally preferred as impractical or to avoid any undesirable side reaction which may in some instances occur at such temperatures. If desired, the reaction can be conducted in a closed vessel at reduced or superatmospheric pressure.

Shorter reaction times are experienced when a low molecular weight aliphatic alcohol and/or a small amount of water is present in the reaction. The alcohol and water function as catalysts to increase the rate of reaction and when employed permit the reaction to be more efficiently carried out at low temperatures and pressures, e.g., room temperature and atmospheric pressure.

The reaction is carried out in an organic solvent. Illustrative of suitable organic solvents are the low molecular weight aliphatic alcohols, such as methanol, ethanol, propanol, and the like; alicyclic alcohols, such as cyclopentanol, cyclohexanol and the like; low molecular weight ketones such as acetone, methyl ethyl ketone and the like; ethers such as diethyl ether, diisopropyl ether, dioxane, tetrahydrofuran, ethylene glycol dimethyl ether, and the like; aromatic hydrocarbons such as benzene, toluene, and the like; and aliphatic hydrocarbons such as petroleum ether, cyclohexane, octane and the like. Any liquid organic compound which does not react to any significant extent with and is a solvent for the monoepoxide and aminoalkylsilicon compound starting materials can be employed. The term "low molecular weight," as used herein to designate the aliphatic alcohol solvent or catalyst and the ketone solvent means that the compound contains from 1 to about 6 carbon atoms. When a low molecular weight aliphatic alcohol is employed as a solvent in the above-described process, it performs the dual function of a catalyst as well.

The compositions of this invention are characterized as being a solution in an organic solvent of the reaction products of a monoepoxide and the aminoalkylsilicon compound having from one to three hydrogen atoms attached to nitrogen atoms of the aminoalkyl groups. The compositions are believed to be complex mixtures of various types of addition and rearrangement compounds of the reaction of the monoepoxide and aminoalkylsilicon compounds. The exact identity of each chemical compound in the reaction product is difficult to determine since procedures employed in isolating and identifying these compounds undoubtedly cause changes in the chemical structure and make-up of such compounds. Surprisingly, it has been found that the compositions per se without further treatment are remarkably effective as sizing or finishing agents for inorganic oxide materials.

The inorganic oxide materials useful in this invention include fibrous glass, silica, mica, quartz, sand, talc, diatomaceous earth, clays, asbestos, crystalline zeolites, iron oxides, zinc oxide, aluminum oxide, calcium oxide, barium oxide, chromium oxide, titanium dioxide, calcium carbonate and the like.

The inorganic oxide materials can be employed in the form of powders, particles, rovings, fibers, mats, cloth and the like. The basis for choice of a particular inorganic oxide material and the form of the material for a particular use is well known and understood by those skilled in the art.

The thermosetting resins which may be more effectively bonded to inorganic oxide materials by the process of this invention include aldehyde condensation resins and epoxy resins. The aldehyde condensation resins are conventionally prepared by the reaction of an aldehyde (or a compound capable upon reaction of yielding an aldehyde, for example hexamethylenetetramine) with an organic compound to produce methylol-containing derivatives which may be partially condensed to resinous materials. Examples of such aldehyde condensation resins include: the phenol-formaldehyde resins, the phenol-acetaldehyde resins, the phenol-furfural resins, the cresol-formaldehyde resins, the urea-formaldehyde resins, the melamine-formaldehyde resins, and the like.

The epoxy resins include, for example, those derived from the diglycidyl ethers of polyhydric phenols as well as blends of such diglycidyl ethers of polyhydric phenols with such modifying ingredients as the polyphenol compounds. Such epoxy resins can be prepared by the reaction of epichlorohydrin with a polyhydric phenol in the presence of a base such as an alkali or alkaline earth metal hydroxide. In the preparation of such epoxy resins various dihydric phenols can be employed to react with epichlorohydrin and they include, 2,2-bis(4-hydroxyphenyl)propane,
bis(4-hydroxyphenyl)methane,
1,7-bis(4-hydroxyphenyl)ethane,
1,1-bis(4-hydroxyphenyl)isobutane,
2,2-bis(4-hydroxyphenyl)butane,
2,2-bis(4-hydroxy-2-methylphenyl)propane,
2,2-bis(4-hydroxy-2-tertiarybutylphenyl)propane,
2,2-bis(2-hydroxynaphthyl)pentane,
and the like.

The thermosetting epoxy resins useful in this invention also include the acid or anhydride curable resins which are derivatives of cyclohexene epoxide, for example 3,4-epoxy - 6 - methylcyclohexylmethyl - 3,4 - epoxy-6-methyl-cyclohexanecarboxylate, 1-epoxyethyl - 3,4 - epoxycyclohexane, dicyclopentadiene dioxide, and the like.

The inorganic oxide materials can be treated with N-substituted aminoalkyl silicon compound compositions by several methods. In one method, the inorganic oxide material is coated with the N-substituted aminoalkylsilicon compound composition and the coated inorganic oxide material is then combined to the thermosetting resin to produce the desired composite article. In another method, a blend of the thermosetting resin and N-substituted aminoalkyl silicon compound composition is prepared and the blend is then combined with the inorganic oxide material in producing the desired composite article.

In either of the methods described in the preceding paragraph, the N-substituted aminoalkyl silicon compound composition (which, as is described in detail hereinabove, comprises an organic solvent solution of the reaction products of monoepoxides with aminoalkylsilicon compounds) can be used directly or the composition can be further diluted with additional organic solvent and/or water. Any of the organic solvents described hereinabove as useful as reaction media for the reaction of the monoepoxide and aminoalkylsilicon compound can be employed as the additional diluent.

The treating composition, whether used to coat the inorganic oxide filler material or used as an additive to the thermosetting resin to form a blend, contains from about one weight percent to 80 weight percent or more of the reaction products of the monoepoxide and aminoalkylsilicon compound, based on the total weight of (1) the aminoalkyl silicon compounds and monoepoxides employed in carrying out the reaction, (2) the organic solvent initially employed as the reaction medium, (3) the additional organic solvent, if employed, and (4) water, if employed.

The inorganic oxide materials can be coated by immersion in the N-substituted aminoalkylsilicon compound composition or such composition can be applied to the inorganic oxide materials by brushing, spraying or other convenient method. The coated inorganic oxide material can then be used in the preparation of composite article without further treatment. However, it is preferable to dry the coated inorganic oxide before combining it with the thermosetting resin. Drying can be accomplished by any convenient means such as air-drying at room temperature or heating in a vented oven.

The coating which adheres to the inorganic oxide material comprises the N-substituted aminoalkylsilicon compound mixture resulting from the reaction of monoepoxides and aminoalkylsilicon compounds as described above, the organic solvent in which such reaction takes place and any additional organic solvent or water added during treatment of the inorganic oxide material being evaporated during the drying step or during the step of heating (curing) the resin-inorganic oxide combination. The amount of N-substituted aminoalkylsilicon compound which (after removal of any organic solvent or water) adheres to the inorganic oxide material in the form of a coating depends on the nature and degree of subdivision of the inorganic oxide material and on the nature and concentration of the coating composition. However, the coating usually represents between about 0.1 and about 25 weight percent based on the total weight of the coating and inorganic oxide material.

Surprisingly, fiber glass cloth finished with the N-substituted aminoalkyl silicon compounds of this invention possessed an exceptionally soft hand. The "hand" or softness of finished cloth is an important physical property in that cloth having a soft hand follows the contours of the mold or laminate structure and therefore is easier to process. Hand is measured quantitavely in terms of "drape" numbers; a value of 6" is extremely stiff; a value of 2–3" is soft and acceptable. The values are determined by running a "drape" test, wherein a strip of cloth 12" x 1" is extended horizontally over a block with a 45° edge unltil the extended portion bends over to touch the 45° plane. The length in inches of the extension is the "drape" number.

The following examples are presented:

The commercial thermosetting epoxy resins of Examples 2, 3, 4 and 6 hereinbelow have the general structure

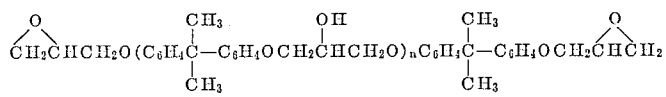

wherein $n$ is an integer.

*Example 1*

The N-substituted aminoalkyl silicon compound composition used in Examples 2, 3 and 4 hereinbelow was prepared as follows: The reaction was carried out in a one-liter 3-neck round bottom flask fitted with agitator, Dry Ice condenser, thermometer and glass frit dispersion tube. To this flask was charged 200 grams gamma-aminopropyltriethoxysilane (triethoxysilylpropylamine) and 177 grams absolute ethanol. A glass vial containing 100 grams ethylene oxide was attached to the disperson tube with Tygon tubing. The ethylene oxide was allowed to slowly distill into the agitated solution of gamma-aminopropyltriethoxysilane in ethanol. During a 5 hour period the temperature of the silane solution increased from 27° C. to 48° C. at which point approximately one half of the ethylene oxide had been passed into the solution. At this point the ethylene oxide vial was immersed in water to increase the rate of distillation and the remainder of the ethylene oxide was passed into the alcohol solution in 1.25 hours. During this 1.25 hours the temperature rose to a maximum of 72° C. The solution was allowed to cool to room temperature and 464 grams of product composition recovered. The product composition comprised about 63 weight percent of the reaction products of the silane and monoepoxide and about 37 weight percent ethanol solvent.

*Example 2*

12 ply, 7" x 7" glass cloth reinforced epoxy resin laminate was prepared from heat cleaned #181–112 glass cloth and a commercial thermosetting resin ("Epon 828," an epoxy resin sold by the Shell Chemical Company) according to the following procedure:

Three hundred grams of the epoxy resin was warmed on a hot plate with stirring to lower its viscosity and to facilitate solution of resin hardener. One weight percent (based on the weight of resin) of the composition prepared as described in Example 1 was dissolved in the warm resin. The hardener, 45 grams of meta-phenylenediamine, was weighed out separately and melted. The molten hardener was added slowly with stirring to the warm resin and stirring continued until a homogeneous solution was obtained.

A sheet of cellophane approximately 42 inches square was placed on a table and one ply of glass cloth 7" x 7" placed on it. A portion of the above described resin blend was evenly poured on the cloth. Another ply of glass cloth was placed on the resin covered glass cloth and additional resin blend was poured on the second cloth. This procedure was continued until 12 plies of cloth had been added and wetted by resin. The excess cellophane was then wrapped over the wet layup in such a manner as to enclose it in a bag and sealed. Air was removed from the laminate by gentle rolling with a bar of wood or metal. The press that was used to cure the laminate was preheated to 250° F. The wet layup was placed in the press and heated for 9 minutes at 250° F. at contact pressure and then for 21 minutes at 250° F. under 200 p.s.i. pressure. The press was cooled prior to removing the laminate. After removal from the press the laminate was post cured for 1 hour at 400° F.

The cellophane sheeting was removed from the laminate and 4" x 0.5" x 0.1" test specimens were cut from the laminate using a diamond saw in a standard table mounting. A portion of the test specimens were used to determine dry flexural strength and another portion were immersed for 72 hours in boiling water prior to testing.

A second laminate was prepared (as a control) according to the procedure described hereinabove except that no N-substituted aminoalkylsilicon compound composition was blended in with the resin. Test specimens (4" x 0.5" x 0.1") were cut from the control laminate.

Flexural strengths were determined on a Baldwin Tate-Emery Testing Machine by the procedure described by MIL-P-8013C and are summarized in the following table:

| Laminate | Flexural Strength, p.s.i. ||
| --- | --- | --- |
| | Dry | 72 Hour Boil |
| Control | 78,000 | 29,000 |
| Prepared with resin blend containing reaction product of ethylene oxide and gamma-aminopropyltriethoxysilane | 87,000 | 55,000 |

*Example 3*

A treating composition was prepared by mixing about 2.2 weight percent of the N-substituted aminoalkyl silicon compound composition prepared as described in Example 1 with about 97.8 weight percent water. Heat cleaned #181–112 glass cloth was immersed in the treating composition, removed, and air-dried. The amount of coating on the glass cloth was about 0.7 weight percent.

Another portion of heat cleaned #181–112 glass cloth was coated by immersion in a solution of about 1.4 weight percent gamma-aminopropyltriethoxysilane in about 98.6 weight percent water followed by air-drying. The amount of coating on the glass cloth was about 0.7 weight percent. The "hand" of the two varieties of coated (finished) glass cloth and of unfinished glass cloth were measured, the results being summarized below.

Twelve ply, 7" x 7" laminates were prepared from the two varieties of coated glass cloth employing the same epoxy resin, (without N-substituted aminoalkylsilicon compound composition additive) resin hardener and lamination procedure as in Example 2. Test samples were cut from the laminates and tested as in Example 2. The results of the drape tests and flexural strength tests are summarized in the following table.

| Laminate | Flexural Strength, p.s.i. || "Hand" (Drape No.), inches |
| --- | --- | --- | --- |
| | Dry | 72 Hour Boil | |
| Control (Same as Example 2) | 78,000 | 29,000 | 2 |
| Prepared with glass cloth finished with gamma-aminopropyltriethoxysilane | 90,000 | 54,000 | 5 |
| Prepared with glass cloth finished with composition containing the reaction product of ethylene oxide and gamma-aminopropyltriethoxysilane | 96,300 | 65,700 | 2.5 |

*Example 4*

Following the procedure of Example 3, a 12 ply, 7" x 7" laminate was prepared from heat cleaned #181–112 glass cloth finished with 0.7 weight percent of the reaction product in ethanol of ethylene oxide and gamma-aminopropyltriethoxy silane and a commercial thermosetting epoxy resin (Bakelite "ERL–2774", an epoxy resin sold by Union Carbide Plastics Company). The laminate had a dry flexural strength of 97,000 p.s.i. and a flexural strength after boiling in water for 72 hours of 70,700 p.s.i.

*Example 5*

Following the procedures of Example 3, 12 ply, 7" x 7" laminates having high flexural strength can be prepared from heat cleaned #181–112 glass cloth finished with the reaction product in methanol of propylene oxide and delta-aminobutyltrimethoxysilane and a commercial thermosetting melamine-aldehyde resin ("Melmac-405", a melamine resin sold by American Cyanamid Company).

*Example 6*

Following the procedures of Example 3, 12 ply, 7" x 7" laminate having high flexural strength can be prepared from heat cleaned #181–112 glass cloth finished with the reaction product in methanol of ethylene oxide and N-(beta-aminoethyl)-gamma-aminopropyltrimethoxysilane and a commercial thermosetting epoxy resin ("Epon 828", an epoxy resin sold by the Shell Chemical Company).

What is claimed is:

1. A cured composite article comprising (1) a cured resin selected from the class consisting of thermosetting aldehyde condensation resins and epoxy resins, (2) a composition comprising the reaction product in an organic solvent of a monoepoxide, said monoepoxide being composed of only carbon, hydrogen and oxygen atoms, and an organosilicon compound selected from the groups consisting of (a) silanes represented by the formula:

(A)

wherein $b$ is an integer having a value from 3 to about 10, R is an alkyl group containing from one to about twelve carbon atoms, R' is a monovalent hydrocarbon group containing from one to about twelve carbon atoms, $y$ is an integer having a value from zero to one, G is selected from the class consisting of the hydrogen atom and R' groups, Q is selected from the class consisting of the hydrogen atom and monovalent groups represented by the formulas:

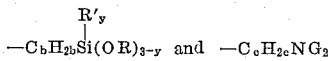

wherein $b$, R, R', $y$ and G have the meanings defined hereinabove and $c$ is an integer having a value from two to about 10, each silicon atom being separated from nitrogen by at least three carbon atoms of a $C_bH_{2b}$ group, nitrogen atoms being separated from each other by at least two carbon atoms of the $C_cH_{2c}$ group and at least one G group is a hydrogen atom, (b) polysiloxanes consisting essentially of units represented by the formula:

(B)
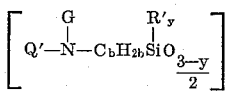

wherein Q' is selected from the class consisting of the hydrogen atom and groups represented by the formulas:

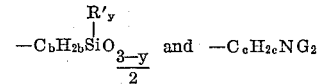

and $b$, R, R', $y$, G and $c$ have the meanings defined hereinabove and (c) polysiloxanes consisting essentially of from 1 to 99 mole percent of units represented by Formula B hereinabove and from 99 to 1 mole percent of units represented by the formula:

(C)
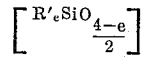

wherein R' has the meaning defined hereinabove and $e$ is an integer having a value from 1 to 3, said organosilicon compound containing at least one hydrogen atom represented by a member selected from the group consisting of Q and G, said reaction product having been produced by reacting an amount of said monoepoxide sufficient to react with all nitrogen-bonded hydrogen atoms of said organosilicon compound and (3) fibrous glass, said fibrous glass being bonded to said cured resin by said reaction product.

2. A cured composite article comprising (1) a cured blend of (i) a resin selected from the class consisting of thermosetting aldehyde condensation resins and epoxy resins, and (ii) a composition comprising an organic solvent solution of the reaction product of a monoepoxide, said monoepoxide being composed of only carbon, hydrogen and oxygen atoms, and an organosilicon compound selected from the group consisting of (a) silanes represented by the formula:

(A)
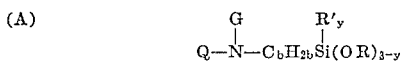

wherein $b$ is an integer having a value from 3 to about 10, R is an alkyl group containing from one to about twelve carbon atoms, R' is a monovalent hydrocarbon group containing from one to about twelve carbon atoms, $y$ is an integer having a value from zero to one, G is selected from the class consisting of the hydrogen atom and R' groups, Q is selected from the class consisting of the hydrogen atom and monovalent groups represented by the formulas:

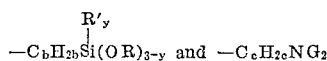

wherein $b$, R, R', $y$ and G have the meanings defined hereinabove and $c$ is an integer having a value from two to about 10, each silicon atom being separated from nitrogen by at least three carbon atoms of a $C_bH_{2b}$ group, nitrogen atoms being separated from each other by at least two carbon atoms of the $C_cH_{2c}$ group and at least one G group is a hydrogen atom, (b) polysiloxanes consisting essentially of units represented by the formula:

(B)
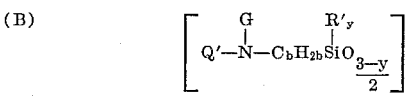

wherein Q' is selected from the class consisting of the hydrogen atom and groups represented by the formulas:

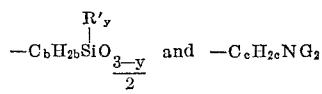

and $b$, R, R', $y$, G and $c$ have the meanings defined hereinabove and (c) polysiloxanes consisting essentially of from 1 to 99 mole percent of units represented by Formula B hereinabove and from 99 to 1 mole percent of units represented by the formula:

(C)

wherein R' has the meaning defined hereinabove and $e$ is an integer having a value from 1 to 3, said organosilicon compound containing at least one hydrogen atom represented by a member selected from the group consisting of Q and G, said reaction product having been produced by reacting an amount of said monoepoxide sufficient to react with all nitrogen-bonded hydrogen atoms of said organosilicon compound and (2) fibrous glass, said fibrous glass being bonded to said cured resin by said reaction product.

3. A cured composite article comprising (1) a cured resin selected from the class consisting of thermosetting aldehyde condensation resins and epoxy resins, and (2) coated fibrous glass wherein the coating is a composition comprising the reaction product in an organic solvent of a monoepoxide, said monoepoxide being composed of only carbon, hydrogen and oxygen atoms, and an organosilicon compound selected from the group consisting of (a) silanes represented by the formula:

(A)
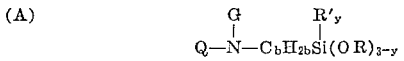

wherein $b$ is an integer having a value from 3 to about 10, R is an alkyl group containing from one to about twelve carbon atoms, R' is a monovalent hydrocarbon group containing from one to about twelve carbon atoms, $y$ is an integer having a value from zero to one, G is selected from the class consisting of the hydrogen atom and R' groups, Q is selected from the class consisting of the hydrogen atom and monovalent groups represented by the formulas:

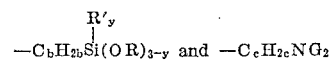

wherein $b$, R, R', $y$ and G have the meanings defined hereinabove and $c$ is an integer having a value from two to about 10, each silicon atom being separated from nitrogen by at least three carbon atoms of a $C_bH_{2b}$ group, nitrogen atoms being separated from each other by at least two carbon atoms of the $C_cH_{2c}$ group and at least one G group is a hydrogen atom, (b) polysiloxanes consisting essentially of units represented by the formula:

(B)
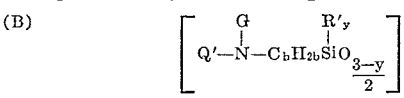

wherein Q' is selected from the class consisting of the hydrogen atom and groups represented by the formulas:

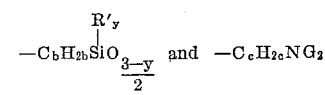

and $b$, R, R', $y$, G and $c$ have the meanings defined hereinabove and (c) polysiloxanes consisting essentially of from 1 to 99 mole percent of units represented by Formula B hereinabove and from 99 to 1 mole percent of units represented by the formula:

(C)

wherein R' has the meaning defined hereinabove and $e$ is an integer having a value from 1 to 3, said organosilicon compound containing at least one hydrogen atom represented by a member selected from the group consisting of Q and G, said reaction product having been produced by reacting an amount of said monoepoxide sufficient to react with all nitrogen-bonded hydrogen atoms of said organosilicon compound, said coated fibrous glass being bonded to said cured resin by said reaction product.

4. A cured composite article comprising (1) a cured thermosetting epoxy resin and (2) coated fibrous glass wherein the coating is a composition comprising the reaction product in an organic solvent of a monoepoxide, said monoepoxide being composed of only carbon, hydrogen and oxygen atoms, and an alkoxysilylalkylamine represented by the formula:

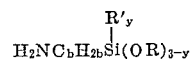

wherein $b$ is an integer having a value of 3 to 10 and the nitrogen atom is separated from the silicon atom by at least three carbon atoms of the $C_bH_{2b}$ group, R is an alkyl group containing from one to about twelve carbon atoms, R' is a monovalent hydrocarbon group containing from one to about twelve carbon atoms and $y$ is an integer having a value of from 0 to 1, said reaction product having been produced by reacting an amount of said monoepoxide sufficient to react with all nitrogen-bonded hydrogen atoms of said alkoxysilylalkylamine said coated fibrous glass being bonded to said cured resin by said reaction product.

5. A cured composite article comprising a cured thermosetting epoxy resin and heat-cleaned glass cloth finished with the reaction product in ethanol of ethylene oxide and gamma-aminopropyltriethoxysilane, said cloth being bonded to said resin by said reaction product, said reaction product having been produced by reacting said ethylene oxide in an amount sufficient to react with all nitrogen-bonded hydrogen of said silane.

6. A process for making cured laminates from thermosetting resins selected from the class consisting of aldehyde condensation resins and epoxy resins which comprises coating heat-cleaned glass cloth with the reaction product in an organic solvent of a monoepoxide, said monoepoxide being composed of only carbon, hydrogen and oxygen atoms, and an alkoxysilylalkylamine represented by the formula:

$$H_2NC_bH_{2b}Si(OR)_{3-y}R'_y$$

wherein $b$ is an integer having a value of 3 to 10 and the nitrogen atom is separated from the silicon atom by at least three carbon atoms of the $C_bH_{2b}$ group, R is an alkyl group containing from one to about twelve carbon atoms, R' is a monovalent hydrocarbon group containing from one to about twelve carbon atoms and $y$ is an integer having a value of from 0 to 1, said reaction product having been produced by reacting an amount of said monoepoxide sufficient to react with all nitrogen-bonded hydrogen atoms of the alkoxysilylalkylamine, thereafter applying to the coated glass cloth a thermosetting resin of the class described and then curing the thermosetting resin to produce a cured laminate having the cured resin bonded to the glass cloth by the reaction product.

7. An improved thermosetting resin which comprises a blend of (1) a thermosetting epoxy resin and (2) a composition comprising the reaction product in ethanol of ethylene oxide and gamma-aminopropyltriethoxysilane, said reaction product being present in an amount sufficient to improve the adherence of the epoxy resin to fibrous glass and said reaction product having been produced by reacting said ethylene oxide in an amount sufficient to react with all nitrogen-bonded hydrogen of said silane.

8. An improved thermosetting resin which comprises a blend of (1) a thermosetting epoxy resin and (2) a composition comprising an organic solvent solution of the reaction product of a monoepoxide, said monoepoxide being composed of only carbon, hydrogen and oxygen atoms, and an organosilicon compound selected from the groups consisting of (a) silanes represented by the formula:

(A) $$Q-N-C_bH_{2b}Si(OR)_{3-y}$$
with G and R'_y substituents wherein $b$ is an integer having a value from 3 to about 10, R is an alkyl group containing from one to about twelve carbon atoms, R' is a monovalent hydrocarbon group containing from one to about twelve carbon atoms, $y$ is an integer having a value from zero to one, G is selected from the class consisting of the hydrogen atom and R' groups, Q is selected from the class consisting of the hydrogen atom and monovalent groups represented by the formulas:

$$-C_bH_{2b}Si(OR)_{3-y}R'_y \text{ and } -C_cH_{2c}NG_2$$

wherein $b$, R, R', $y$ and G have the meanings defined hereinabove and $c$ is an integer having a value from two to about ten, each silicon atom being separated from nitrogen by at least three carbon atoms of a $C_bH_{2b}$ group, nitrogen atoms being separated from each other by at least two carbon atoms of the $C_cH_{2c}$ group and at least one G group is a hydrogen atom, (b) polysiloxanes consisting essentially of units represented by the formula:

(B) $$\left[Q'-N-C_bH_{2b}SiO_{\frac{3-y}{2}}\right]$$
with G and R'_y substituents wherein Q' is selected from the class consisting of the hydrogen atom and groups represented by the formulas:

$$-C_bH_{2b}SiO_{\frac{3-y}{2}}R'_y \text{ and } -C_cH_{2c}NG_2$$

and $b$, R, R', $y$, G and $c$ have the meanings defined hereinabove and (c) polysiloxanes consisting essentially of from 1 to 99 mole percent of units represented by Formula B hereinabove and from 99 to 1 mole percent of units represented by the formula:

(C) $$\left[R'_eSiO_{\frac{4-e}{2}}\right]$$

wherein R' has the meaning defined hereinabove and $e$ is an integer having a value from 1 to 3, said organosilicon compound containing at least one hydrogen atom represented by a member selected from the group consisting of Q and G, said reaction product being present in an amount sufficient to improve the adherence of the epoxy resin to fibrous glass and said reaction product having been produced by reacting an amount of said monoepoxide sufficient to react with all nitrogen-bonded hydrogen atoms of the organosilicon compound.

References Cited by the Examiner

UNITED STATES PATENTS

| | | | |
|---|---|---|---|
| 2,819,245 | 1/1958 | Shorr | 117—126 |
| 2,843,560 | 7/1958 | Mika | 117—126 |
| 2,946,701 | 7/1960 | Plueddemann | 117—126 |
| 2,970,969 | 2/1961 | Shultz et al. | 117—126 |
| 2,974,062 | 3/1961 | Collier | 117—126 |
| 3,032,576 | 5/1962 | Morehouse | 260—448.2 |
| 3,032,577 | 5/1962 | Morehouse | 260—448.2 |
| 3,042,544 | 7/1962 | Marzocchi | 117—72 |

FOREIGN PATENTS

| | | |
|---|---|---|
| 625,353 | 8/1961 | Canada. |
| 1,052,354 | 3/1959 | Germany. |

RICHARD D. NEVIUS, *Primary Examiner.*

JOSEPH REBOLD, *Examiner.*

R. B. MURRAY, *Assistant Examiner.*